US010502068B2

(12) United States Patent
Clark et al.

(10) Patent No.: US 10,502,068 B2
(45) Date of Patent: Dec. 10, 2019

(54) ENGINE WITH CHEVRON PIN BANK

(71) Applicant: General Electric Company, Schenectady, NY (US)

(72) Inventors: Emily Clark Clark, Cincinnati, OH (US); Julienne LaChance, Princeton, NJ (US)

(73) Assignee: General Electric Company, Schenectady, NY (US)

( * ) Notice: Subject to any disclaimer, the term of this patent is extended or adjusted under 35 U.S.C. 154(b) by 309 days.

(21) Appl. No.: 15/367,978

(22) Filed: Dec. 2, 2016

(65) Prior Publication Data
US 2018/0156041 A1 Jun. 7, 2018

(51) Int. Cl.
*F01D 5/18* (2006.01)

(52) U.S. Cl.
CPC .............. *F01D 5/187* (2013.01); *F01D 5/186* (2013.01); *F05D 2250/75* (2013.01); *F05D 2260/22141* (2013.01); *Y02T 50/676* (2013.01)

(58) Field of Classification Search
CPC ...... F01D 5/187; F01D 5/186; F05D 2250/75; F05D 2260/22141
See application file for complete search history.

(56) References Cited

U.S. PATENT DOCUMENTS

| 5,797,726 | A | 8/1998 | Lee | |
|---|---|---|---|---|
| 7,347,671 | B2 | 3/2008 | Dorling et al. | |
| 7,373,778 | B2* | 5/2008 | Bunker | F01D 25/12 431/351 |
| 7,568,887 | B1* | 8/2009 | Liang | F01D 5/187 416/97 R |
| 7,637,720 | B1* | 12/2009 | Liang | F01D 5/187 416/96 R |
| 8,668,453 | B2* | 3/2014 | Lee | F01D 5/187 416/96 R |
| 8,807,945 | B2* | 8/2014 | Spangler | F01D 5/187 416/97 R |
| 9,314,838 | B2* | 4/2016 | Pointon | F01D 5/187 |
| 2006/0120868 | A1* | 6/2006 | Dorling | F01D 5/187 416/97 R |
| 2010/0221121 | A1* | 9/2010 | Liang | F01D 5/187 416/97 R |
| 2014/0147287 | A1* | 5/2014 | Xu | F01D 5/186 416/96 R |
| 2016/0369637 | A1* | 12/2016 | Subramanian | F01D 11/122 |
| 2017/0096900 | A1* | 4/2017 | Bunker | F01D 5/141 |
| 2017/0204879 | A1* | 7/2017 | Zaccardi | F01D 9/065 |
| 2017/0314398 | A1* | 11/2017 | Slavens | F01D 5/187 |

FOREIGN PATENT DOCUMENTS

EP 1111190 A1 6/2001

* cited by examiner

*Primary Examiner* — Nathaniel E Wiehe
*Assistant Examiner* — Andrew J Marien
(74) *Attorney, Agent, or Firm* — McGarry Bair PC

(57) ABSTRACT

An apparatus for a turbine engine, such as a gas turbine engine, can include an engine component such as an airfoil. The airfoil includes an outer wall with a pressure side and a suction side confronting a hot gas flow exterior of the airfoil. A cooling circuit can provide a flow of cooling fluid through the interior of the airfoil to cool the airfoil operating within the hot gas flow. The cooling circuit can include a pin bank to induce turbulence on the cooling fluid to improve cooling of the airfoil.

21 Claims, 7 Drawing Sheets

US 10,502,068 B2

ENGINE WITH CHEVRON PIN BANK

BACKGROUND OF THE INVENTION

Turbine engines, and particularly gas or combustion turbine engines, are rotary engines that extract energy from a flow of combusted gases passing through the engine onto a multitude of rotating turbine blades.

Gas turbine engines for aircraft are designed to operate at high temperatures to maximize engine efficiency, so cooling of certain engine components, such as the high pressure turbine and the low pressure turbine, can be beneficial. Typically, cooling is accomplished by ducting cooler air from the high and/or low pressure compressors to the engine components that require cooling. Temperatures in the high pressure turbine are around 1000° C. to 2000° C. and the cooling air from the compressor is around 500° C. to 700° C. While the compressor air is a high temperature, it is cooler relative to the turbine air, and can be used to cool the turbine.

Contemporary turbine blades generally include one or more interior cooling circuits for routing the cooling air through the blade to cool different portions of the blade, and can include dedicated cooling circuits for cooling different portions of the blade, such as the leading edge, trailing edge and tip of the blade.

BRIEF DESCRIPTION OF THE INVENTION

In one aspect, the disclosure relates to an airfoil for a turbine engine including an outer wall defining a pressure side and a suction side extending axially between a leading edge and a trailing edge defining a chord-wise direction and extending radially between a root and a tip defining a span-wise direction. A cooling circuit is located within the airfoil including cooling passage with opposing sidewalls and at least partially defining the cooling circuit. A pin bank is provided in the cooling passage and includes at least one chevron pin extending between the opposing sidewalls.

In another aspect, the disclosure relates to a component for a turbine engine including a wall separating a cooling airflow from a hot airflow having a first surface facing the cooling airflow and a second surface facing the hot airflow. A cooling circuit is at least partially defined by the wall and includes a cooling passage having opposing sidewalls and at least partially defining the cooling circuit. A pin bank is provided in the cooling passage and includes at least one chevron pin extending between the opposing sidewalls.

DESCRIPTION OF EMBODIMENTS OF THE INVENTION

Figure 1:
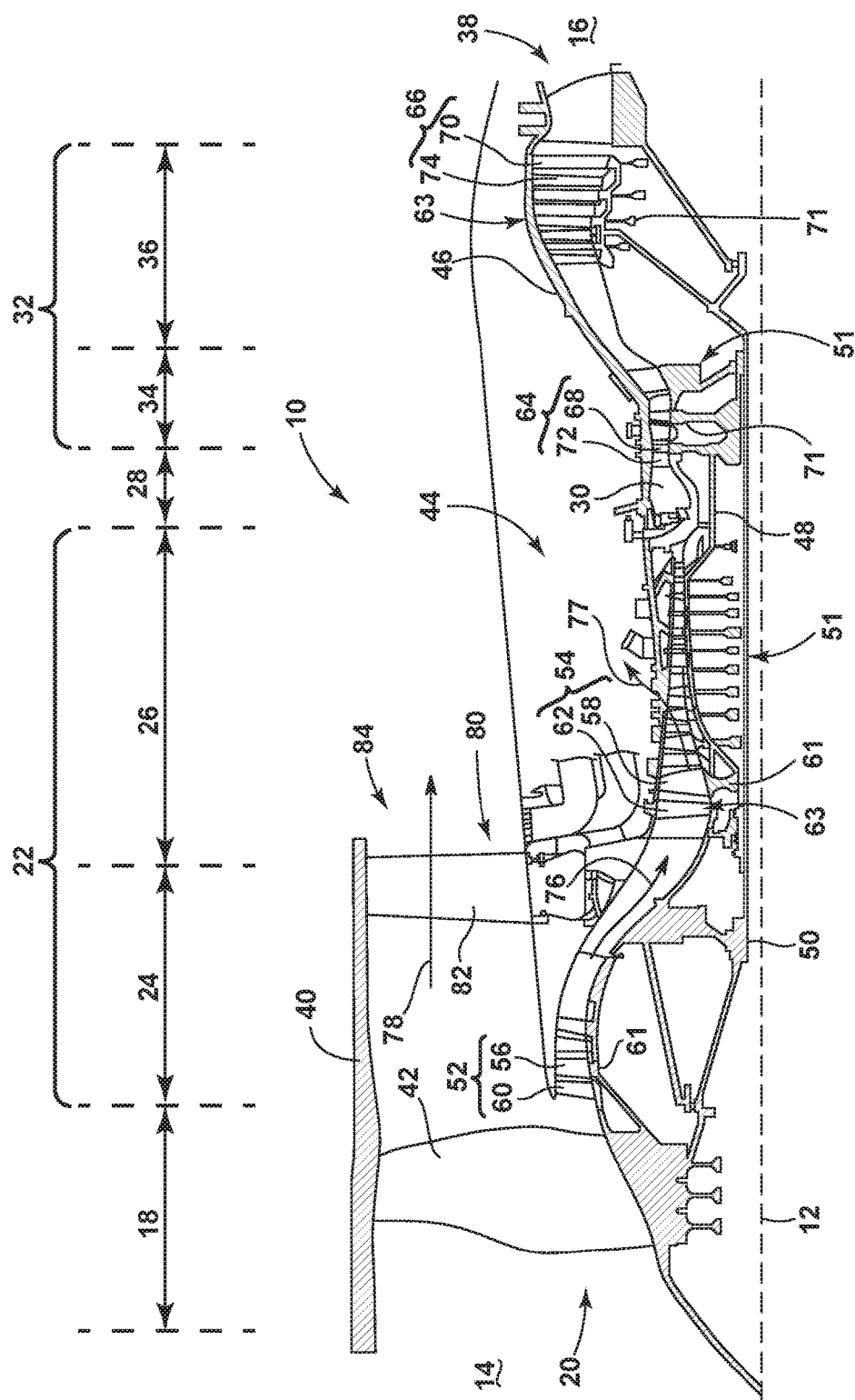
FIG. 1 is a schematic cross-sectional diagram of a gas turbine engine for an aircraft.

The described embodiments of the present invention are directed to one or more chevron pins forming a pin bank in a cooling passage for a component of an engine, such as an airfoil. While the present aspects will be described in relation to an airfoil, it should be understood that it can have equal applicability with any engine component utilizing pin cooling. For purposes of illustration, the present invention will be described with respect to the turbine for an aircraft gas turbine engine. It will be understood, however, that the invention is not so limited and may have general applicability within an engine, including compressors, as well as in non-aircraft applications, such as other mobile applications and non-mobile industrial, commercial, and residential applications.

As used herein, the term "forward" or "upstream" refers to moving in a direction toward the engine inlet, or a component being relatively closer to the engine inlet as compared to another component. The term "aft" or "downstream" used in conjunction with "forward" or "upstream" refers to a direction toward the rear or outlet of the engine or being relatively closer to the engine outlet as compared to another component.

Additionally, as used herein, the terms "radial" or "radially" refer to a dimension extending between a center longitudinal axis of the engine and an outer engine circumference.

All directional references (e.g., radial, axial, proximal, distal, upper, lower, upward, downward, left, right, lateral, front, back, top, bottom, above, below, vertical, horizontal, clockwise, counterclockwise, upstream, downstream, forward, aft, etc.) are only used for identification purposes to aid the reader's understanding of the present invention, and do not create limitations, particularly as to the position, orientation, or use of the invention. Connection references (e.g., attached, coupled, connected, and joined) are to be construed broadly and can include intermediate members between a collection of elements and relative movement between elements unless otherwise indicated. As such, connection references do not necessarily infer that two elements are directly connected and in fixed relation to one another. The exemplary drawings are for purposes of illustration only and the dimensions, positions, order and relative sizes reflected in the drawings attached hereto can vary.

FIG. 1 is a schematic cross-sectional diagram of a gas turbine engine 10 for an aircraft. The engine 10 has a generally longitudinally extending axis or centerline 12 extending forward 14 to aft 16. The engine 10 includes, in downstream serial flow relationship, a fan section 18 including a fan 20, a compressor section 22 including a booster or low pressure (LP) compressor 24 and a high pressure (HP) compressor 26, a combustion section 28 including a combustor 30, a turbine section 32 including a HP turbine 34, and a LP turbine 36, and an exhaust section 38.

The fan section 18 includes a fan casing 40 surrounding the fan 20. The fan 20 includes a plurality of fan blades 42 disposed radially about the centerline 12. The HP compressor 26, the combustor 30, and the HP turbine 34 form a core 44 of the engine 10, which generates combustion gases. The core 44 is surrounded by core casing 46, which can be coupled with the fan casing 40.

A HP shaft or spool 48 disposed coaxially about the centerline 12 of the engine 10 drivingly connects the HP turbine 34 to the HP compressor 26. A LP shaft or spool 50, which is disposed coaxially about the centerline 12 of the engine 10 within the larger diameter annular HP spool 48, drivingly connects the LP turbine 36 to the LP compressor 24 and fan 20. The spools 48, 50 are rotatable about the engine centerline and couple to a plurality of rotatable elements, which can collectively define a rotor 51.

The LP compressor 24 and the HP compressor 26 respectively include a plurality of compressor stages 52, 54, in which a set of compressor blades 56, 58 rotate relative to a corresponding set of static compressor vanes 60, 62 (also called a nozzle) to compress or pressurize the stream of fluid passing through the stage. In a single compressor stage 52, 54, multiple compressor blades 56, 58 can be provided in a ring and can extend radially outwardly relative to the centerline 12, from a blade platform to a blade tip, while the corresponding static compressor vanes 60, 62 are positioned upstream of and adjacent to the rotating blades 56, 58. It is noted that the number of blades, vanes, and compressor stages shown in FIG. 1 were selected for illustrative purposes only, and that other numbers are possible.

The blades 56, 58 for a stage of the compressor can be mounted to a disk 61, which is mounted to the corresponding one of the HP and LP spools 48, 50, with each stage having its own disk 61. The vanes 60, 62 for a stage of the compressor can be mounted to the core casing 46 in a circumferential arrangement.

The HP turbine 34 and the LP turbine 36 respectively include a plurality of turbine stages 64, 66, in which a set of turbine blades 68, 70 are rotated relative to a corresponding set of static turbine vanes 72, 74 (also called a nozzle) to extract energy from the stream of fluid passing through the stage. In a single turbine stage 64, 66, multiple turbine blades 68, 70 can be provided in a ring and can extend radially outwardly relative to the centerline 12, from a blade platform to a blade tip, while the corresponding static turbine vanes 72, 74 are positioned upstream of and adjacent to the rotating blades 68, 70. It is noted that the number of blades, vanes, and turbine stages shown in FIG. 1 were selected for illustrative purposes only, and that other numbers are possible.

The blades 68, 70 for a stage of the turbine can be mounted to a disk 71, which is mounted to the corresponding one of the HP and LP spools 48, 50, with each stage having a dedicated disk 71. The vanes 72, 74 for a stage of the compressor can be mounted to the core casing 46 in a circumferential arrangement.

Complementary to the rotor portion, the stationary portions of the engine 10, such as the static vanes 60, 62, 72, 74 among the compressor and turbine section 22, 32 are also referred to individually or collectively as a stator 63. As such, the stator 63 can refer to the combination of non-rotating elements throughout the engine 10.

In operation, the airflow exiting the fan section 18 is split such that a portion of the airflow is channeled into the LP compressor 24, which then supplies pressurized airflow 76 to the HP compressor 26, which further pressurizes the air. The pressurized airflow 76 from the HP compressor 26 is mixed with fuel in the combustor 30 and ignited, thereby generating combustion gases. Some work is extracted from these gases by the HP turbine 34, which drives the HP compressor 26. The combustion gases are discharged into the LP turbine 36, which extracts additional work to drive the LP compressor 24, and the exhaust gas is ultimately discharged from the engine 10 via the exhaust section 38. The driving of the LP turbine 36 drives the LP spool 50 to rotate the fan 20 and the LP compressor 24.

A portion of the pressurized airflow 76 can be drawn from the compressor section 22 as bleed air 77. The bleed air 77 can be drawn from the pressurized airflow 76 and provided to engine components requiring cooling. The temperature of pressurized airflow 76 entering the combustor 30 is significantly increased. As such, cooling provided by the bleed air 77 is necessary for operating of such engine components in the heightened temperature environments.

A remaining portion of the airflow 78 bypasses the LP compressor 24 and engine core 44 and exits the engine assembly 10 through a stationary vane row, and more particularly an outlet guide vane assembly 80, comprising a plurality of airfoil guide vanes 82, at the fan exhaust side 84. More specifically, a circumferential row of radially extending airfoil guide vanes 82 are utilized adjacent the fan section 18 to exert some directional control of the airflow 78.

Some of the air supplied by the fan 20 can bypass the engine core 44 and be used for cooling of portions, especially hot portions, of the engine 10, and/or used to cool or power other aspects of the aircraft. In the context of a turbine engine, the hot portions of the engine are normally downstream of the combustor 30, especially the turbine section 32, with the HP turbine 34 being the hottest portion as it is directly downstream of the combustion section 28. Other sources of cooling fluid can be, but are not limited to, fluid discharged from the LP compressor 24 or the HP compressor 26.

Figure 2:
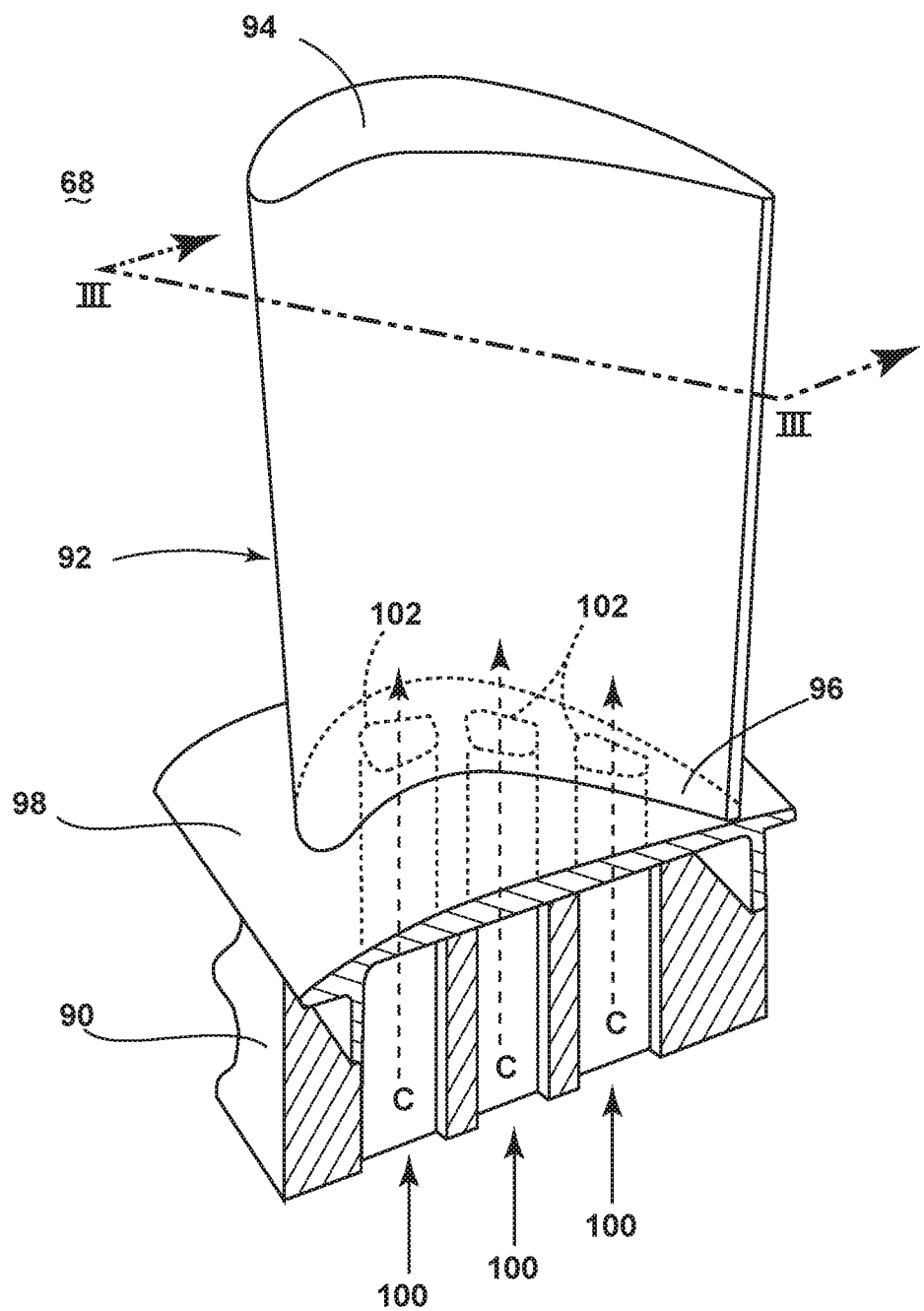
FIG. 2 is an isometric view of an airfoil of the engine of FIG. 1 in the form of a blade.

FIG. 2 is a perspective view of an engine component in the form of one of the turbine blades 68 of the engine 10 from FIG. 1. The turbine blade 68 includes a dovetail 90 and an airfoil 92. The airfoil 92 includes a tip 94 and a root 96 defining a span-wise direction therebetween. The airfoil 92 mounts to the dovetail 90 at a platform 98 at the root 96. The platform 98 helps to radially contain the turbine engine mainstream airflow. The dovetail 90 can be configured to mount to a turbine rotor disk 71 on the engine 10 (FIG. 1). The dovetail 90 further includes at least one inlet passage 100, exemplarily shown as a three inlet passages 100, each extending through the dovetail 90 to provide internal fluid communication with the airfoil 92 at a passage outlet 102. It should be appreciated that the dovetail 90 is shown in cross-section, such that the inlet passages 100 are housed within the body of the dovetail 90. A flow of cooling air C can be provided to the airfoil 92 through the inlet passages 100. The flow of cooling air C can be used to cool portions of the airfoil 92 operating under heightened temperatures.

Figure 3:
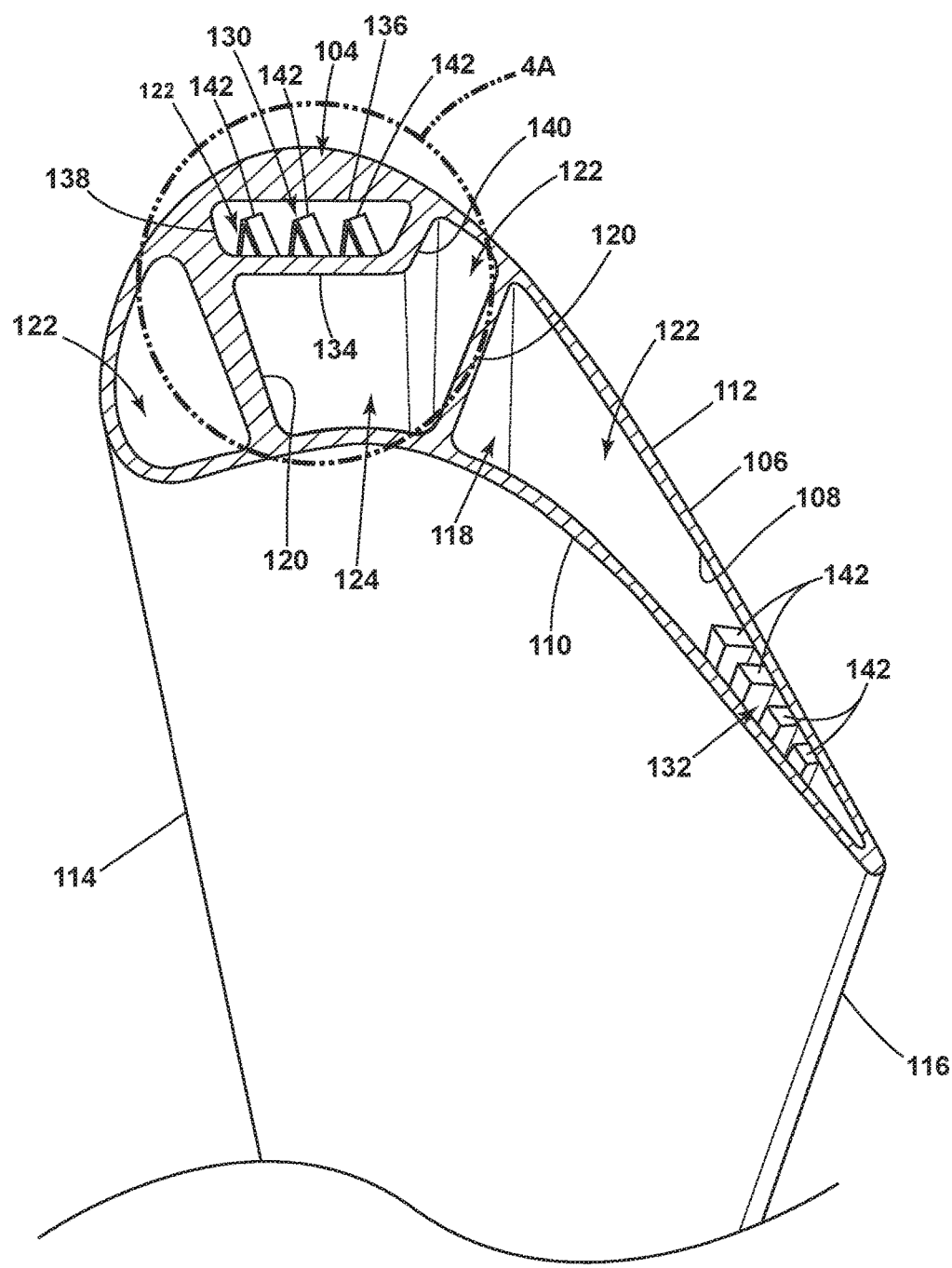
FIG. 3 is an isometric, cross-section of the airfoil of FIG. 2 taken across section 3-3, illustrating two exemplary locations for pin banks.

Turning to FIG. 3, an isometric view of the airfoil 92 is shown in cross-section, including an outer wall 104 having a first surface 106 and a second surface 108. The first surface 106 can be an exterior surface of the airfoil 92 confronting a hot airflow and the second surface 108 can be an interior surface of the airfoil 92 confronting a cooling airflow, such as the cooling airflow C of FIG. 2. The outer wall 104 further defines a concave-shaped pressure sidewall 110 and a convex-shaped suction sidewall 112 which are joined together to define an airfoil shape with a leading edge 114 and a trailing edge 116, defining a chord-wise direction therebetween. The airfoil 92 has an interior 118 defined by the sidewalls 110, 112. The blade 68 rotates in a direction such that the pressure sidewall 110 follows the suction sidewall 112. Thus, as shown in FIG. 3, the airfoil 92 would rotate upward toward the top of the page and somewhat into the page.

One or more ribs 120 can divide the interior 118 into multiple cooling passages 122. The cooling passages 122 can extend through the airfoil 92 in a substantially span-wise direction. It should be understood that the cooling passage 122 and the particular interior of the airfoil 92 is exemplary and for purposes of understanding only. The cooling passages 122 can include additional elements, such as passages, channels, circuits, pin banks, sub-circuits, plenums, near-wall cooling circuits, or similar. The cooling channels 122 and any such additional elements can form a cooling circuit 124 within the interior 118 of the airfoil 92.

The interior 118 can further include a first pin bank 130 and a second pin bank 132. The first pin bank 130 can be provided along the suction side 112 of the outer wall 104 and the second pin bank 132 can be provided at the trailing edge 116. The first pin bank 130 can include a first sidewall 134 and a second sidewall 136, with the second sidewall 136 formed as a portion of the outer wall 104. It should be appreciated that the outer wall 104 need not form a portion of the first pin bank 130. The first and second sidewalls 134, 136 can connect by a first endwall 138 and a second endwall 140 to define the pin bank 130 as a cooling passage 122 extending in the span-wise direction through the airfoil 92. As shown, the first endwall 138 is formed as part of the rib 120. One or more chevron pins 142 extend between the first and second sidewalls 134. The first pin bank 130 can be a form a cooling passage 122 between the sidewalls 134, 136 and the end walls 138, 140, or can be formed as part of the cooling passage 122 defined by the ribs 120. Regardless, it should be appreciated that the first pin bank 130 is provided in a cooling passage 122 formed as a portion of the cooling circuit 124 through the airfoil 92.

The second pin bank 132 can be provided within the cooling passage 122 adjacent the trailing edge 116, without requiring sidewalls or endwall, as opposed to the first pin bank 130. The second pin bank 132 includes one or more chevron pins 142 extending between the pressure sidewall 110 and the suction sidewall 112 of the outer wall 104.

It should be understood that the locations, number, and orientations of the cooling passages 122, pin banks 130, 132, and the chevron pins 142 should not be limited as shown. The airfoil 92 of FIG. 3 is by way of example only to facilitate understanding of the aspects described herein. The number, organization, geometry, position, or otherwise of the cooling passages 122, cooling circuit 124, pin banks 130, 132, or chevron pins 142 can vary in any manner such that a cooling airflow can be provided through a cooling passage of a cooling circuit extending through the airfoil 92, with a pin bank provided in the cooling passage with at least one chevron pin provided in the pin bank.

Additionally, it should be appreciated that the aspects of the airfoil 92 can have equal applicability to any engine component utilizing pin bank cooling. The outer wall 104 can be a wall of such an engine component for separating a hot airflow from a cooling airflow at the first and second surfaces 106, 108 respectively, for example. A cooling passage having opposing sidewalls can extend through such an engine component defining at least a portion of a cooling circuit for providing the cooling airflow through the component, and including a set of pins to form a pin bank in the cooling passage. At least one chevron pin can be included in the set of pins of the pin bank provided in the cooling passage of the engine component.

Figure 4B:
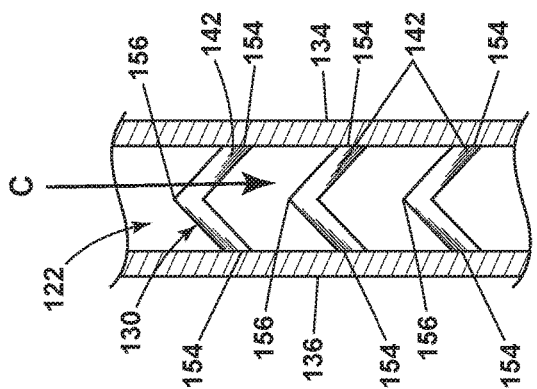
FIG. 4B is a side view of the pin bank of FIG. 4A taken across section 4B-4B.
Figure 4A:
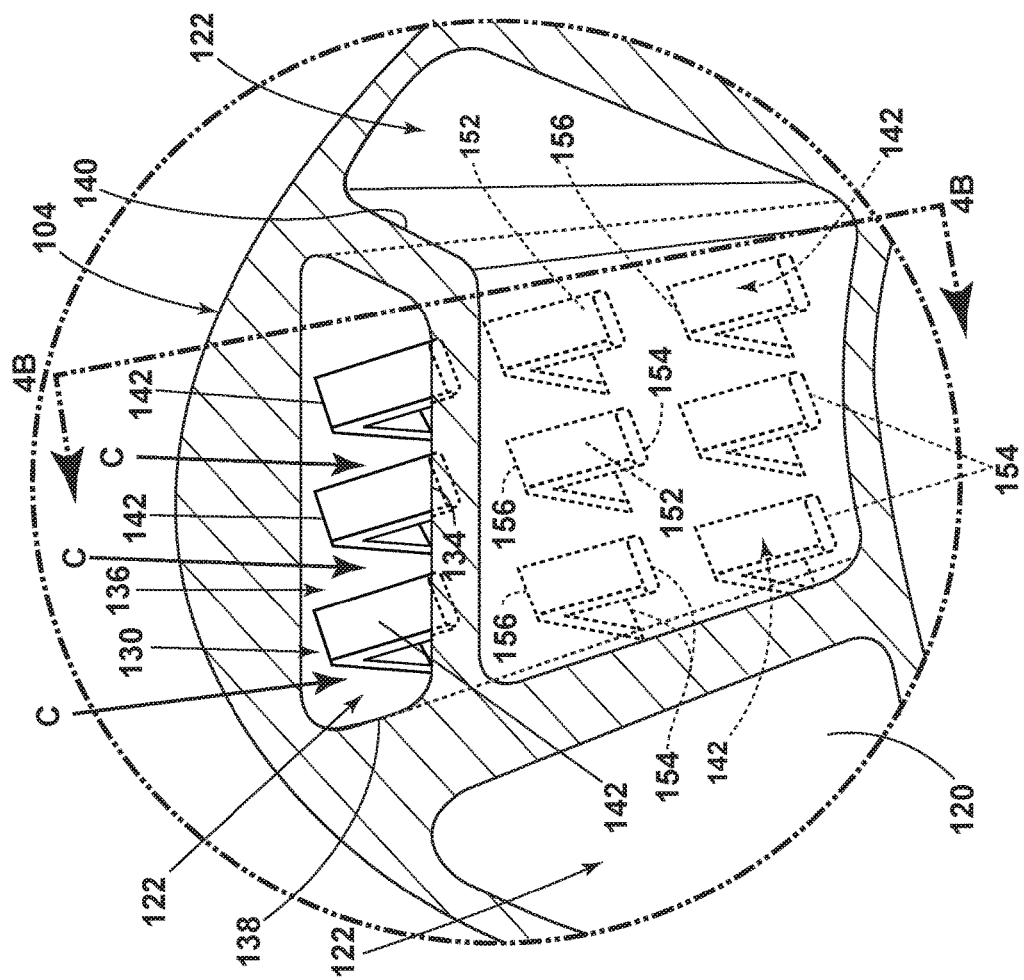
FIG. 4A is an enlarged view of one pin bank of FIG. 3 illustrating a set of chevron pins.

Referring now to FIG. 4A, an enlarged view of portion 4A of FIG. 3 shows the first pin bank 130 of FIG. 3, with portions of the chevron pins 142 shown in dashed line behind the second sidewall 136. In FIG. 4A, the flow of cooling fluid C can move in the span-wise direction along the cooling passage 122, or in a direction substantially in the span-wise direction. The chevron pins 142 can include a pair of legs 152 terminating at opposing feet 154 and joining at a junction 156. The legs 152 meet at the junction 156 within the cooling passage 122, with the legs 152 coupling the chevron pin 142 to the first and second sidewalls 134, 136 separately at the feet 154. The chevron pin 142 spans the cooling passage 122, with the feet 154 coupled to the opposing walls 134, 136 and the junction 156 pointing toward the incoming flow of cooling fluid C. In the isometric perspective view of FIG. 4A, the chevron pins 142 are angled such that the junction 156 points toward both the first end wall 138 and are slightly angled relative to the direction of the flow of cooling fluid C.

The chevron pins 142 forming the first pin bank 130 are arranged in a set. While nine chevron pins 142 are shown, it should be appreciated that a set can include one or more. Furthermore, not all pins in the set need be chevron pins 142. For example, the first pin bank 130 can include a mixture of chevron pins 142 and other pins. The set is arranged in three columns, with adjacent columns being slightly offset. The offset nature of the columns provides for a greater surface area of the first pin bank 130 confronting the flow of cooling air C through the cooling passage 122. It should be appreciated that the organization of the first pin bank 130 as shown in FIG. 4A is exemplary. The first pin bank 130 can include any number of pins in any organization, such as rows, columns, a pattern, multiple local patterns, or a unique organization in non-limiting examples.

Referring now to FIG. 4B, a cross-sectional view of the first pin bank 130 shows the junction 156 pointed toward and confronting the flow of cooling fluid C. FIG. 4B is taken across section 4B-4B of FIG. 4A, such that the FIG. 4B extends substantially in the span-wise direction from top to bottom. The chevron pins 142 mount to the first and second sidewalls 134, 136 at the feet 154, with the legs 152 extending into the cooling passage 122. The chevron pins 142 are shaded for easy identification in the figure.

Figure 5B:
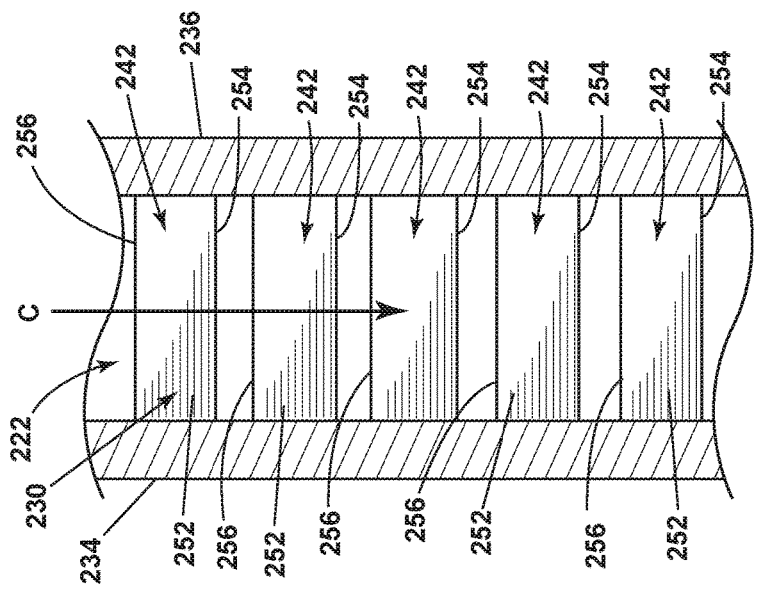
FIG. 5B is a side view of the pin bank of FIG. 5A taken across section 5B-5B.
Figure 5A:
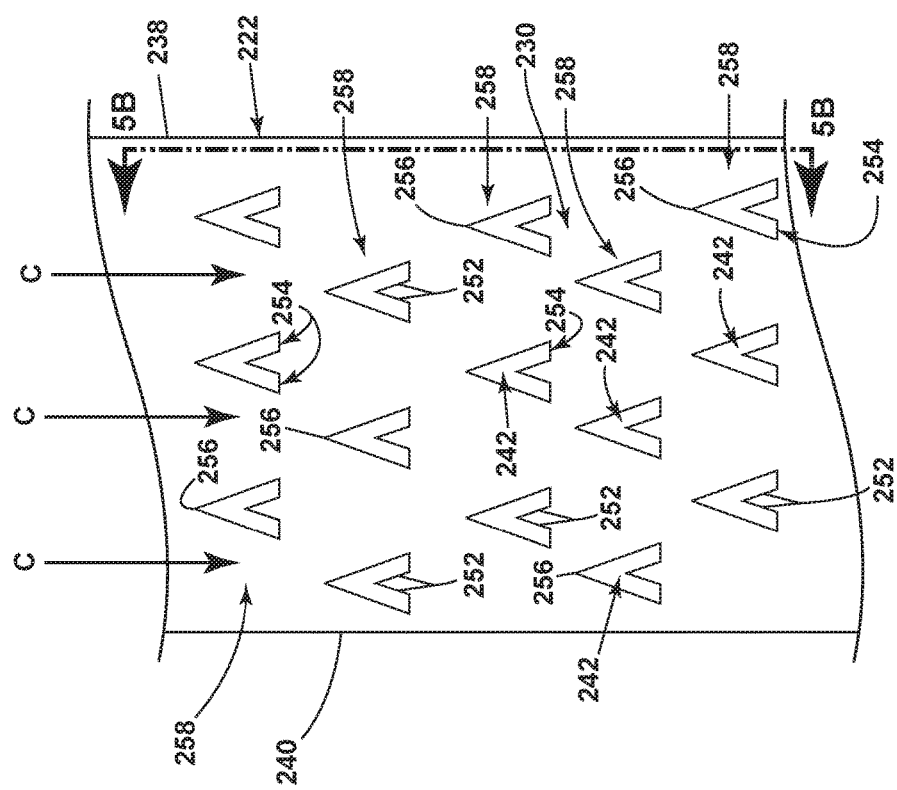
FIG. 5A is a profile view of another pin bank of FIG. 3 illustrating a set of chevron pins in another orientation.

FIG. 5A shows another exemplary pin bank 230. The pin bank 230 of FIG. 5A can be substantially similar to the first pin bank of 130 of FIGS. 3-4B. As such, similar elements will be identified with similar numerals increased by a value of one hundred. A cooling passage 222 can be defined between a first end wall 238 and a second endwall 240. One or more chevron pins 242 can be provided in the cooling passage 222, as a straight pin having a chevron-shaped profile. The chevron pins 242 can mount between a first sidewall (not shown) and a second sidewall 236, spanning the cooling passage 222. The first sidewall is now shown for clarity to see the profile of the chevron pins 242.

The chevron pins 242 include two legs 252 joining at a junction 256 and terminating at opposing feet 254. The chevron pins 242 are oriented such that the junctions 256 are confronting the cooling fluid flow C. However, the chevron pins 242 are not so limited and can have any orientation relative to the cooling fluid flow C.

The chevron pins 242 are organized into five columns 258, with adjacent columns being offset by one another. Such an organization is exemplary, and it should be appreciated that the pin bank 230 can have any organization of pins 242, such as rows, columns, patterns, or otherwise in non-limiting examples.

FIG. 5B, shows a cross-sectional view of the cooling passage 222 of FIG. 5A taken across section 5B-5B of FIG. 5A. FIG. 5B best illustrates the extension of the pins 242 between the first sidewall 234 and the second sidewall 236. The pins 242 are shaded to facilitate identification. As shown, only one leg 252 is visible extending between the junction 256 and one foot 254. The junction 256 confronts the flow of cooling fluid C passing through the cooling passage 222.

FIGS. 6A-6E illustrate one chevron pin 342 which can be any chevron pin as described herein. The chevron pin 342 of FIGS. 6A-6E can be substantially similar to that of FIGS. 5A-5B. As such, similar elements will be used to described similar elements increased by a value of one hundred.

Figure 6A:
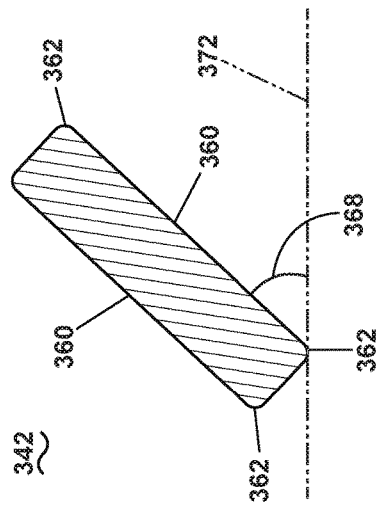
FIG. 6A is an isolated view of one chevron pin of FIGS. 4A-5B.
Figure 6B:
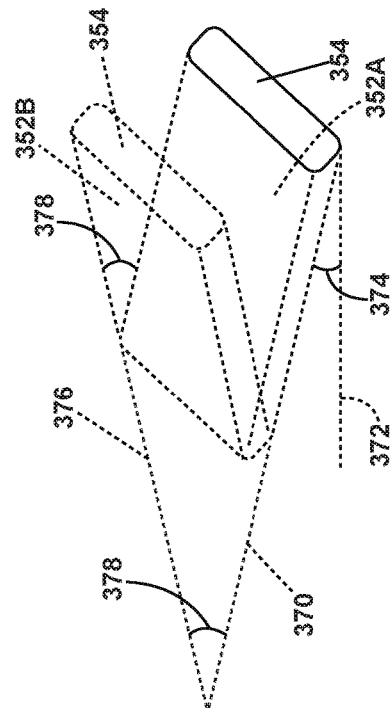
FIG. 6B is a cross-sectional view of the chevron pin of FIG. 6A.

Referring now to FIG. 6A, a chevron pin 342 includes two legs 352 connected at a junction 356 and terminating at opposing feet 354. The legs 352 can include a length L. One leg 352 need not have the same length L as the other leg 352. FIG. 6B is a cross-sectional view taken across section VI-VI of FIG. 6A. The chevron pin 342 can have a rounded, rectangular profile, including linear edge 360 with rounded corners 362. It should be appreciated that the chevron pin 342 and any chevron pin described herein can include any profile, such as square, rectangular, circular, oval, elliptical, concave, convex, or any combination therein in non-limiting examples, and can be arranged in any orientation. Such a profile will be reflected at the feet of the chevron pin 342. However, the profile can vary along the length of the chevron pin 342, such that the profile at a first portion of the chevron pin 342 can be different from the profile at another portion of the chevron pin 342.

Additionally, a passage axis 372 can be defined along the cooling passage parallel to the local streamline flow of the cooling fluid flow C. The chevron pin 342 can be tilted at an angle such that the entirety of the chevron pin 342 is tilted relative to the cooling fluid flow C. A profile angle 368 can be defined between the surface of the linear edge 360 and the passage axis 372. The profile angle 368 can be between 30-degrees and 60-degrees and can be 45-degrees in one non-limiting example, while any angle from 1-degree to 90-degrees is contemplated.

Figure 6C:
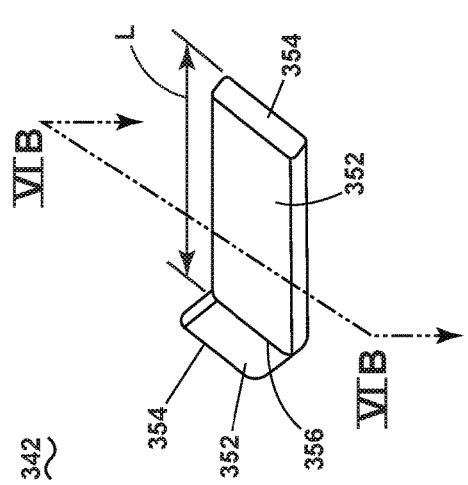
FIG. 6C is a side view of the chevron pin of FIG. 6A illustrating an angled orientation for the chevron pin.

Referring now to FIG. 6C, the chevron pin 342 can be angled. The leg 352 can define a leg axis 370 along the longitudinal length L of the leg. The leg axis 352 can also define a body axis for the chevron pin 342, extending along the longitudinal length of both legs 352 and the body of the chevron pin 342. The passage axis 372 can be defined along the cooling passage parallel to the local streamline flow of the cooling fluid flow C through the cooling passages (FIGS. 3-5B), which can be oriented axially or radially. A pitch angle 374 can be defined between the leg axis 370 and the passage axis 372. The pitch angle 374 can range from 0-degree, where the chevron pin 342 is aligned with the cooling passage (FIGS. 3-5B), to 89-degrees, where the junction 356 slightly confronts the flow of cooling fluid C. It should be appreciated, however, that any angled orientation of the chevron pin 342 is contemplated.

Figure 6D:
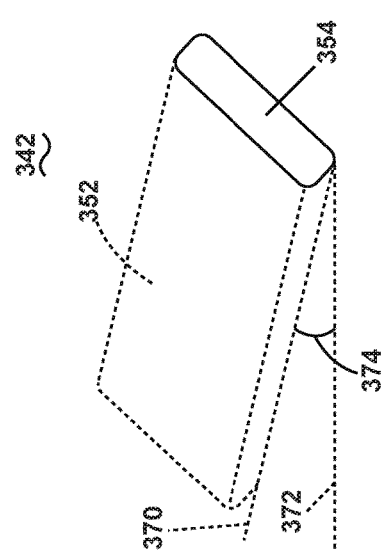
FIG. 6D is a side view of the chevron pin of FIG. 6A with offset legs.

Referring now to FIG. 6D, the chevron pin 342 can include two legs 352 with each leg 352 oriented at an angle relative to the longitudinal length of the cooling passage (FIGS. 3-5B). The legs 352 can be separated into a first leg 352A and a second leg 352B. The first leg 352A can be offset from the passage axis 372 by the pitch angle 374. The second leg 352B can define a second leg axis 376 along the longitudinal length of the second leg 352B. An included angle 378 can be defined between the leg axis 370 and the second leg axis 376. The included angle 378 can range from 0-degrees, such that the second leg 352B is parallel to the first leg 352A, and 180-degrees, where the second leg 352B extends opposite of the first leg 352A.

Figure 6E:
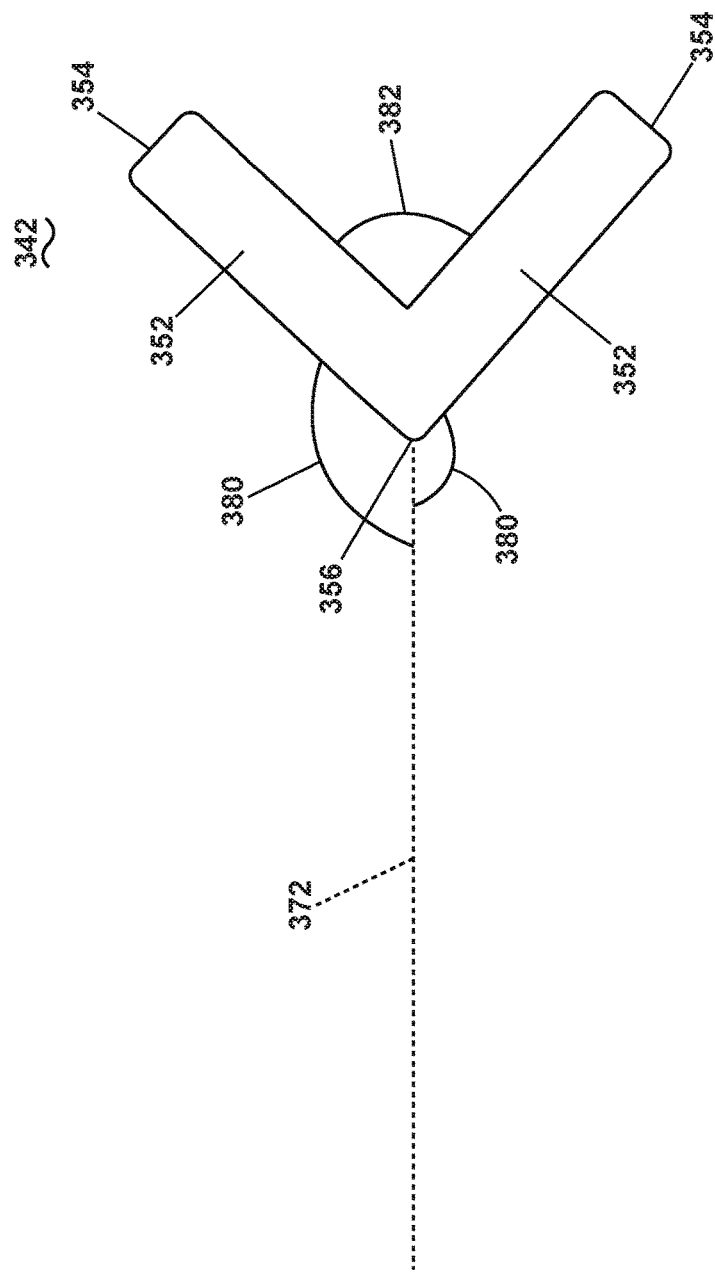
FIG. 6E is a profile view of the chevron pin of FIG. 6A.

FIGS. 6C-6D can be used to particularly orient the chevron pin 342 when each foot 354 is coupled to one of the sidewalls 134, 136 (FIGS. 3-4B). Referring now to FIG. 6E, in the case where the chevron pin 342 is positioned with the feet 354 spanning the cooling passage 222 (FIGS. 5A-5B) the chevron pin 342 can be oriented with the junction 356 confronting the cooling fluid flow C. The feet 354 can be angled relative to the passage axis 372 by a confronting angle 380. The confronting angle 380 can be determined relative to either leg 352, and can be different among the legs 352 of the same chevron pin 342. Additionally, a rear leg angle 382 can be defined between the legs 352. The rear leg angle can be between 30-degrees and 60-degrees, such as 45-degrees in one non-limiting example, while angles from 0-degrees to 179-degrees are contemplated.

The passage axis 372 of FIGS. 6C-6E can also be defined as a centerline of the cooling passage, which can be non-linear extending through the curved geometry of the airfoil or engine component. The chevron pin 342 can be angled relative to the local centerline passage axis 372 of the cooling passage. In the example of FIG. 6E, each leg 352 can be oriented relative to the local centerline passage axis 372 by the confronting angle 380.

It should be appreciated that the chevron pins as described herein provide for improving cooling of a cooling passage pin bank, providing for an increased heat transfer coefficient along the pin bank, such as that of a turbine engine airfoil in one example. The chevron pins provide for increased turbulence of the airflow passing through the pin bank, improving local convection cooling of the airfoil or component. The chevron-shaped pins of the pin bank can increase the heat transfer coefficient within the pin bank, improving cooling effectiveness by 45% or more over typical cylindrical-type pin banks. Such improved cooling can extend operating life of the airfoil, reducing required maintenance, and saving costs. Additionally, the chevron pins can reduce dust collection within the pin banks, further improving lifetime of the airfoil or component.

Furthermore, the improved cooling effectiveness of the chevron pins can reduce the required overall cooling flow, improving engine efficiency and performance.

Further still, it should be understood that the orientation, shape, location, positioning, and pattern of the chevron pins can be adapted and tailored to the particular needs of the particular engine component. For example, the chevron pins can be oriented to direct a greater volume of airflow towards one side of the cooling passage, such as the side adjacent to the hot flow exterior of the airfoil or the component. With such adapting or tailoring, cooling efficiency of the pin bank can be further improved, further increasing the benefits from the chevron pins.

It should be appreciated that application of the disclosed design is not limited to turbine engines with fan and booster sections, but is applicable to turbojets and turbo engines as well.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. An airfoil for a turbine engine, the airfoil comprising:
    an outer wall defining a pressure side and a suction side extending axially between a leading edge and a trailing edge defining a chord-wise direction and extending radially between a root and a tip defining a span-wise direction;
    a cooling circuit located within the airfoil and with a cooling passage including opposing sidewalls, and at least partially defining the cooling circuit; and
    a pin bank provided in the cooling passage comprising multiple chevron pins with at least one chevron pin of the multiple chevron pins including a pair of linear legs joined at a junction, where the multiple chevron pins are arranged in rows where the chevron pins in each row are separated by an intervening gap, where the rows are offset such that one intervening gap of one row is aligned in the span-wise direction with a chevron pin of an adjacent row; and
    at least one cooling fluid flow path extending in the span-wise direction through the one intervening gap of the one row and intersecting the chevron pin of the adjacent row.

2. The airfoil of claim 1 wherein the pair of linear legs terminates at opposing feet.

3. The airfoil of claim 2 wherein the feet mount to the sidewalls of the cooling passage.

4. The airfoil of claim 2 wherein the feet are provided in the cooling passage, extending between the opposing sidewalls.

5. The airfoil of claim 2 wherein the pair of legs defines an included angle and the included angle is between 30 degrees and 60 degrees.

6. The airfoil of claim 5 wherein the included angle is 45 degrees.

7. The airfoil of claim 1 wherein the cooling passage defines a passage axis along a longitudinal length of the cooling passage and the at least one chevron pin is oriented at a pitch angle relative to the passage axis.

8. The airfoil of claim 1 wherein the cooling passage includes a local centerline, and the at least one chevron pin is angled at a pitch angle relative to the local centerline of the cooling passage.

9. The airfoil of claim 8 wherein the at least one chevron pin includes a pair of legs and each leg is angled at a different confronting angle relative to the local centerline of the cooling passage.

10. The airfoil of claim 1 wherein the at least one chevron pin includes a cross-sectional profile that is a rounded rectangular shape.

11. The airfoil of claim 1 wherein the at least one chevron pin is formed by additive manufacturing.

12. The airfoil of claim 1 wherein each of the multiple chevron pins forming the pin bank comprises a corresponding pair of linear legs joined at a junction.

13. The airfoil of claim 1 wherein the at least one chevron pin provides for an increased heat transfer coefficient along the cooling passage at the pin bank.

14. A component for a turbine engine, the component comprising:
    a wall separating a cooling airflow from a hot airflow having a first surface facing the cooling airflow and a second surface facing the hot airflow;
    a cooling circuit at least partially defined by the wall and including a cooling passage having opposing sidewalls and defining a passage axis along a longitudinal length of the cooling passage; and
    a pin bank provided in the cooling passage comprising multiple chevron pins with at least one chevron pin of the multiple chevron pins including a pair of linear legs joined at a junction, where the multiple chevron pins are arranged in rows where the chevron pins in each row are separated by an intervening gap, where the rows are offset such that one intervening gap of one row is aligned along the passage axis with a chevron pin of an adjacent row; and
    at least one cooling fluid flow path extending along the passage axis through the one intervening gap of the one row and intersecting the chevron pin of the adjacent row.

15. The component of claim 14 wherein the pair of linear legs terminates at opposing feet.

16. The component of claim 15 wherein the feet mount to the sidewalls of the cooling passage.

17. The component of claim 15 wherein the feet are provided in the cooling passage, extending between the opposing sidewalls.

18. The component of claim 14 wherein the at least one chevron pin is oriented at a pitch angle relative to the passage axis.

19. The component of claim 14 wherein the cooling passage includes a local centerline, and the at least one chevron pin is angled at a pitch angle relative to the local centerline of the cooling passage.

20. The component of claim 19 wherein the at least one chevron pin includes a pair of legs and each leg is angled at a different confronting angle relative to the local centerline of the cooling passage.

21. An airfoil for a turbine engine, the airfoil comprising:
    an outer wall defining a pressure side and a suction side extending axially between a leading edge and a trailing edge defining a chord-wise direction and extending radially between a root and a tip defining a span-wise direction;
    a cooling circuit located within the airfoil and with a cooling passage including opposing sidewalls, and at least partially defining the cooling circuit; and
    a pin bank provided in the cooling passage comprising a set of chevron pins arranged in rows, with the chevrons in each row separated by an intervening gap, and the rows being offset, such that the chevron pins of one row are aligned with the gap of an adjacent row, and the chevron pins of the one row have an effective width confronting the gap that is wider than the gap of the adjacent row; and
    at least one cooling fluid flow path through the rows is at least partially defined by the gaps in sequential rows.

* * * * *